(12) United States Patent
Haeussermann et al.

(10) Patent No.: US 11,649,747 B2
(45) Date of Patent: May 16, 2023

(54) LIQUID FILTER DEVICE

(71) Applicant: Mahle International GmbH, Stuttgart (DE)

(72) Inventors: Uli Haeussermann, Fellbach (DE); Heiko Hensinger, Stuttgart (DE)

(73) Assignee: Mahle International GmbH

( * ) Notice: Subject to any disclaimer, the term of this patent is extended or adjusted under 35 U.S.C. 154(b) by 81 days.

(21) Appl. No.: 17/094,803

(22) Filed: Nov. 10, 2020

(65) Prior Publication Data
US 2021/0140350 A1    May 13, 2021

(30) Foreign Application Priority Data
Nov. 11, 2019 (DE) .......................... 102019217385.3

(51) Int. Cl.
| | |
|---|---|
| *B01D 29/96* | (2006.01) |
| *F01M 11/03* | (2006.01) |
| *B01D 29/15* | (2006.01) |
| *B01D 35/16* | (2006.01) |
| *F01M 1/10* | (2006.01) |

(52) U.S. Cl.
CPC ............ *F01M 11/03* (2013.01); *B01D 29/15* (2013.01); *B01D 29/96* (2013.01); *B01D 35/16* (2013.01); *B01D 2201/0415* (2013.01); *B01D 2201/305* (2013.01); *B01D 2201/4007* (2013.01); *B01D 2201/4046* (2013.01); *B01D 2201/4084* (2013.01); *F01M 2001/1064* (2013.01)

(58) Field of Classification Search
CPC ........... F01M 11/03; F01M 2001/1064; B01D 29/15; B01D 29/96; B01D 35/16; B01D 2201/0415; B01D 2201/305; B01D 2201/4007; B01D 2201/4046; B01D 2201/4084; B01D 2201/347; B01D 29/21; B01D 35/153; B01D 36/001
See application file for complete search history.

(56) References Cited

U.S. PATENT DOCUMENTS

| | | | |
|---|---|---|---|
| 2004/0094464 A1 * | 5/2004 | Baumann ............. | B01D 35/153 210/248 |
| 2004/0232063 A1 | 11/2004 | Cline et al. | |

FOREIGN PATENT DOCUMENTS

| | | | | |
|---|---|---|---|---|
| WO | WO-2007140247 A2 | 12/2007 | | |
| WO | WO-2018053168 A1 * | 3/2018 | ............. | B01D 29/33 |

\* cited by examiner

*Primary Examiner* — Waqaas Ali
(74) *Attorney, Agent, or Firm* — Fishman Stewart PLLC

(57) ABSTRACT

A liquid filter device may include a filter housing and a ring filter element arranged in the filter housing. The filter housing may include a filter housing cover and a filter housing pot connectable tightly therewith via a housing seal. A discharge channel, a central clean channel, and a vent channel may be disposed in the filter housing pot. The ring filter element may include an upper end plate, a lower end plate, and a pleated star. When the liquid filter device is in an operating state, a pin arranged on the lower end plate may be disposed in and seal the discharge channel via a first seal, a second seal arranged on the lower end plate may be disposed against a surface of the clean channel, and a third seal arranged on the upper end plate may be disposed against a surface of the vent channel.

16 Claims, 4 Drawing Sheets

LIQUID FILTER DEVICE

CROSS-REFERENCE TO RELATED APPLICATIONS

This application claims priority to German Patent Application No. DE 10 2019 217 385.3, filed on Nov. 11, 2019, the contents of which is hereby incorporated by reference in its entirety.

TECHNICAL FIELD

The present invention relates to a liquid filter device with a filter housing formed from a filter housing cover and a filter housing pot able to be connected tightly therewith via a housing seal. The invention relates furthermore to a ring filter element for such a liquid filter device and a method for emptying the liquid filter device.

BACKGROUND

In an exchange of a ring filter element from a liquid filter device, for example a fuel filter or an oil filter, usually the filter housing is firstly opened, for example by unscrewing a filter housing cover, which leads to a raising of the ring filter element and to a removing of a pin, arranged on the ring filter element, from an associated discharge channel of a filter housing pot. Hereby it is possible to drain liquid still present in the filter housing of the liquid filter device before the complete opening of the filter housing, and thereby in particular to prevent an undesired exiting of the liquid into the environment.

A disadvantage in the liquid filter devices known from the prior art is, however, in certain circumstances, that on an emptying of the filter housing, after the unscrewing of a filter housing cover in certain circumstances non-purified liquid can arrive from a raw side to a clean side, which is to be avoided in all circumstances.

SUMMARY

The present invention is therefore concerned with the problem of indicating for a liquid filter device of the generic type an improved or at least an alternative embodiment, which in particular overcomes the disadvantages which are known from the prior art.

This problem is solved according to the invention by the subject matter of the independent claim(s). Advantageous embodiments are the subject matter of the dependent claim(s).

The present invention is based on the general idea of designing a liquid filter device in such a way, through arrangement of different seals, that in the case of opening a filter housing an undesired passing over of a non-purified fluid from a raw side to a clean side of a ring filter element can be reliably prevented. The liquid filter device according to the invention has here the previously described filter housing with a filter housing pot and a filter housing cover which is able to be connected, for example able to be screwed, therewith. A discharge channel, in particular a return channel, a central clean channel and a vent channel arranged, in particular coaxially, in the clean channel, are provided here in the filter housing pot. Also arranged in the filter housing is a ring filter element with an upper end plate, a lower end plate and a pleated star arranged therebetween and formed from a filter material. On the lower end plate an axially and eccentrically protruding pin is arranged, which in the operating state of the liquid filter device dips tightly via a first seal into the discharge channel and thereby closes the latter. On the lower end plate in addition a central second seal is provided, which in the operating state of the liquid filter device lies tightly against an outer peripheral surface of the clean channel, and separates a raw side of the ring filter element from a clean side. On the upper end plate of the ring filter element in addition a central third seal is arranged, which in the operating state of the liquid filter device lies tightly against an outer peripheral surface of the vent channel and separates the raw side from the clean side. The vent channel therefore completely penetrates the ring filter element and in the installed state projects with its free end above over the upper end plate of the ring filter element. According to the invention, the previously described seals are now arranged with respect to one another in particular with respect to a height, in such a way that in the case of opening of the filter housing cover, for example an unscrewing thereof from the filter housing pot, firstly the first seal and subsequently the housing seal and the second seal is/are opened, so that air flows via the housing seal onto the raw side and this discharges until a liquid level on the raw side falls below the second seal and air arrives onto the clean side and subsequently the clean side discharges. In the casing of opening the filter housing, i.e. an unscrewing of the filter housing cover from the filter housing pot, therefore firstly the ring filter element is drawn upwards via the filter housing cover, whereupon the pin arranged on the lower end plate of the ring filter element is drawn out from the discharge channel and the latter is opened. Via the housing seal, which is now opened on further unscrewing of the filter housing cover, air can arrive onto the raw side of the ring filter element, whereby it can be emptied via the discharge channel. In so far as the housing seal is opened, the second seal is also opened, whereby basically a connection is created between the raw side and the clean side. This leads firstly to the liquid level falling on the raw side, until it arrives below the second seal, whereupon air can then flow via the opened second seal onto the clean side, and the emptying of the clean side can begin.

Alternatively, it is also conceivable that the individual seals are arranged with respect to one another in such a way that in the case of opening the filter housing cover, firstly the first seal at the pin and subsequently the housing seal, the second seal and the third seal is/are opened, so that air flows via the housing seal simultaneously onto the raw side and the clean side, and thereby the raw side and the clean side can discharge simultaneously. Irrespective of the selected embodiment variant, in both, the purpose of the invention is namely to reliably prevent an undesired passing of raw-side liquid over to the clean side. With respect to a vertical position of the individual seals in the installed state with respect to one another, the first seal is arranged below and, thereabove, the second seal, the housing seal and the third seal.

In an advantageous further development of the solution according to the invention, a free end of the vent channel lies above a free end of the clean channel. Hereby, a reliable venting and thereby a consistent provision of the entire filter surface can be enabled. The vent channel can be arranged here coaxially in the clean channel, which offers the great advantage that the ring filter element is rotatable via its second seal and its third seal about one axis, which enables the introducing of the pin into the discharge channel. Alternatively, of course, it is also conceivable that the vent channel is not arranged coaxially in the clean channel, so that the axes of the second and third seal of the ring filter element run parallel to one another, whereby in connection with the eccentrically arranged pin a key-lock system can be created, which imposes exclusively the installation of authorized ring filter elements, as these must have a predefined spatial parallel position of the axis of the pin, the axis of the second seal and the axis of the third seal. Other ring filter elements which do not have these features can not be mounted in the respective liquid filter device with eccentrically arranged vent channel In an advantageous further development of the solution according to the invention, the clean channel has an upwardly directed cross-section taper, wherein the second seal of the ring filter element in the operating state of the liquid filter device lies beneath the cross-section taper against the outer peripheral surface of the clean channel. In the case of a screwing of the filter housing and a raising, connecting therewith, of the ring filter element, the second seal is drawn from the outer peripheral surface upwards in the direction of the cross-section taper, wherein in the case of a passing over of the cross-section taper, a gap is produced between the outer peripheral surface of the clean channel, reducing in diameter, and the second seal. Hereby, a connection is provided between the raw side and the clean side, whereby either a successive discharging of the raw side and of the clean side in accordance with the first variant, or a simultaneous discharging according to the second variant, is enabled.

In an advantageous further development of the solution according to the invention, the liquid filter device is formed as a fuel filter, as a urea filter or as an oil filter. This non-exhaustive list already suggests what varied possibilities for use or respectively also fields of use are available for the liquid filter device according to the invention.

Expediently, the seals are arranged with respect to one another in such a way that a distance $a_1$ in axial direction between the first and the second seal and a distance $a_2$ in axial direction between the second and the third seal fulfils the following relationship: $2<a_2/a_1<20$, preferably $5<a_2/a_1<15$. Hereby, it can be guaranteed that the liquid filter device in the case of opening of the filter housing can discharge via the discharge channel, without an undesired passing of liquid over from the raw side to the clean side taking place.

The sequence of opening of the seals with respect to one another is important. The central O-ring is to open simultaneously or earlier than the pin O-ring and the cover O-ring.

The present invention is based further on the general idea of indicating a ring filter element for the previously described liquid filter device with an upper end plate, a lower end plate and a pleated star arranged therebetween. On the lower end plate, the axially and eccentrically protruding pin, is arranged here with a first seal, wherein on the lower end plate in addition a central second seal is arranged. On the upper end plate a third seal is provided, wherein the individual seals are arranged with respect to one another in such a way that a distance $a_1$ in axial direction between the first and the second seal, and a distance $a_2$ in axial direction between the second and the third seal fulfils the following relationship: $2<a_2/a_1<20$, preferably $5<a_2/a_1<15$. Hereby, a specific ring filter element can be created, which is formed with respect to the arrangement, in particular with respect to the individual height positions of the individual seals in such a way that in the case of an exchange of the ring filter element a reliable discharging of a filter housing can take place without it having to be feared that, in so doing, non-purified fluid arrives from the raw side to the clean side.

Expediently, in particular one-piece, detent contours are arranged on the upper end plate of the ring filter element, which in the installed state in the filter housing interact with counter-detent contours arranged on the filter housing cover, and in the case of an unscrewing of the filter housing cover from the filter housing pot bring about a raising of the ring filter element. The detent contours here can be detent hooks arranged in a circular shape, which interact with detent hooks on the filter housing cover which are formed in a complementary manner thereto and are likewise arranged in a circular shape. Hereby, a screwing of the filter housing cover with a simultaneous raising of the ring filter element and a drawing out of its pin from the discharge channel on the filter housing pot side is possible. Through a one-piece configuration of the detent contours with the upper end plate of the ring filter element, these can be produced together with the upper end plate as a one-piece plastic injection moulded part and thereby can be produced not only in a high quality but also at a favourable cost.

The present invention is based further on the general idea of indicating a method for emptying the liquid filter device in accordance with the previous paragraphs, in which firstly the filter housing cover is detached from the filter housing pot, in particular is unscrewed. "Unscrewed" means here not completely unscrewed, but rather firstly only unscrewed by a few rotations, wherein the twisting of the filter housing cover over the corresponding detent contours leads to a raising of the ring filter element. Hereby the latter is drawn upwards, whereby the pin is drawn out from the discharge channel and thereby the first seal is released. Subsequently, a further unscrewing of the filter housing cover takes place, until the housing seal and the second seal are opened, so that air can flow via the housing seal onto the raw side and this discharges until a liquid level on the raw side falls below the second seal and then air arrives onto the clean side, and the clean side can discharge. Subsequently, the filter housing cover can be unscrewed completely, and the ring filter element can be removed.

Alternatively, it is of course also conceivable that in the case of the unscrewing of the filter housing cover from the filter housing pot, firstly the first seal and subsequently the housing seal, the second seal and the third seal are opened, so that in this case, after the opening of the discharge channel, air can flow via the housing seal simultaneously onto the raw side and via the third seal onto the clean side, and thereby the raw side and the clean side can discharge simultaneously. Both alternative method variants have in common here that despite an opened second seal or respectively despite an opened third seal, a discharging of the raw side and of the clean side can take place, without it having to be feared here that non-filtered liquid arrives from the raw side to the clean side.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown here, respectively schematically.

DETAILED DESCRIPTION

Figures 1A, 1B:
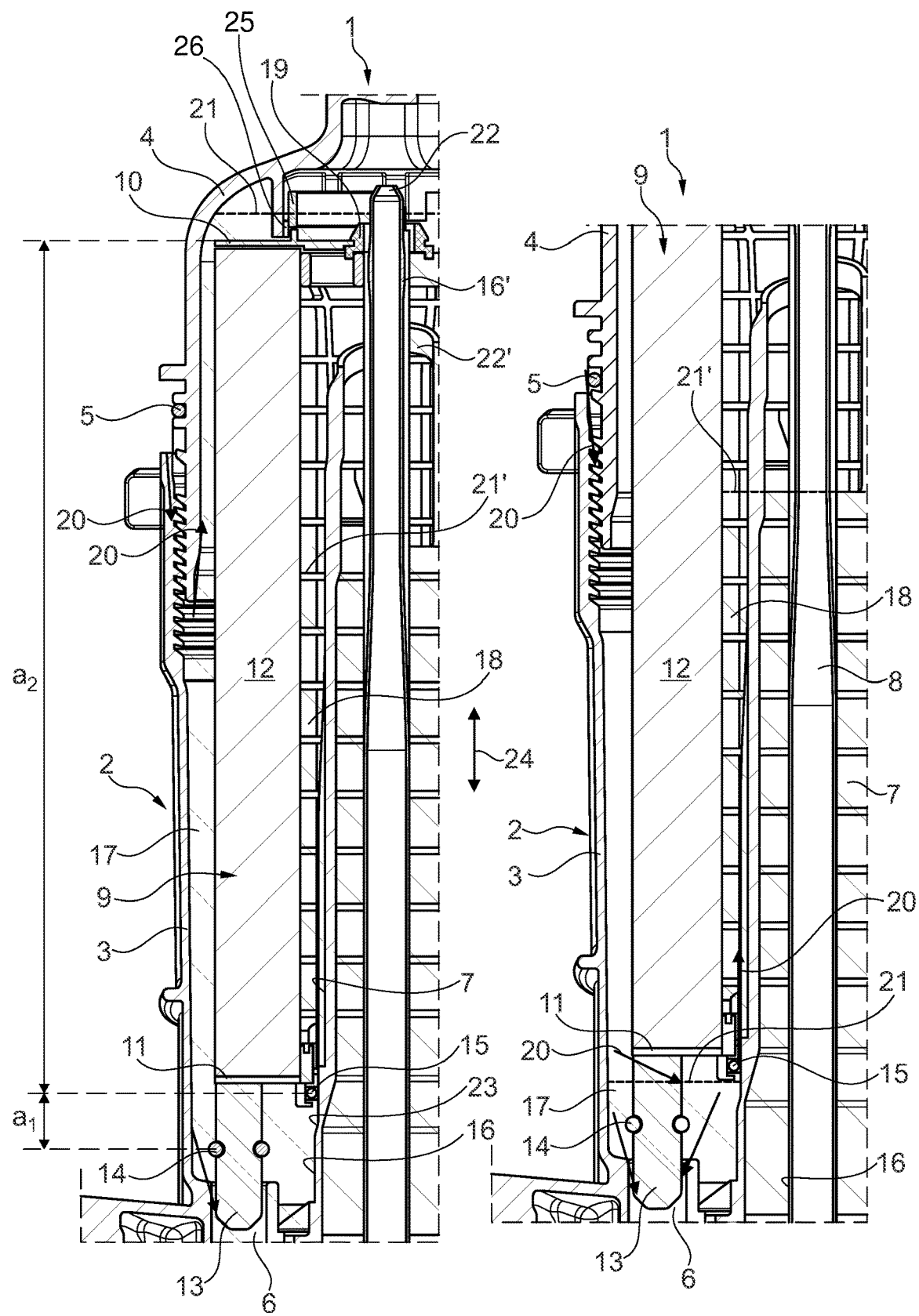
FIG. 1A shows a sectional view through a liquid filter device according to the invention with a raised filter housing cover and entry of air via the housing seal onto a raw side and a draining of liquid from the raw side into a discharge channel.
FIG. 1B shows a view as in FIG. 1A wherein, however, the liquid level on the raw side has fallen so far that air can arrive via a second seal onto the clean side and the latter can drain.
Figure 1C:
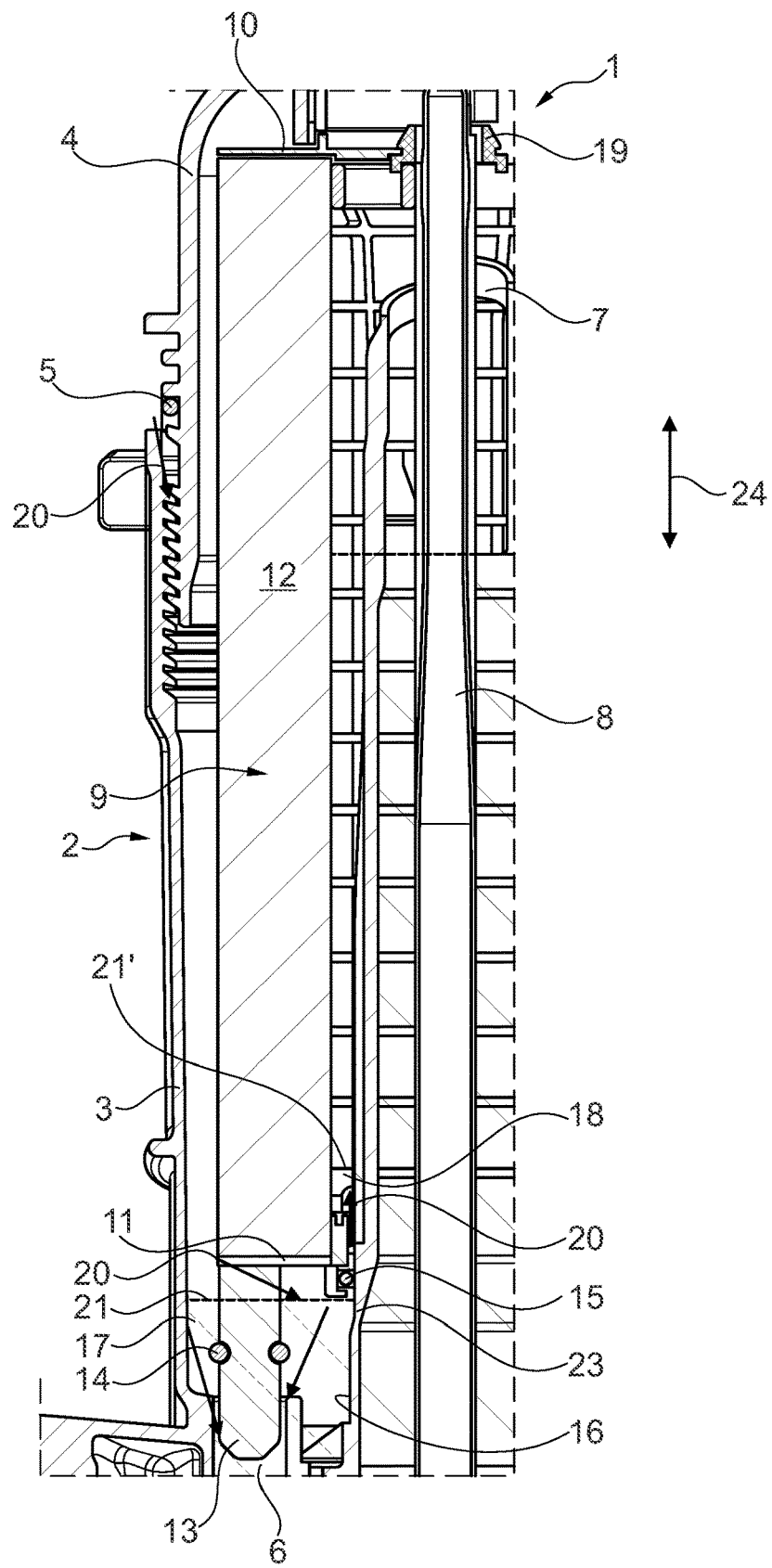
FIG. 1C shows a view as in FIG. 1B, however with a distinctly reduced liquid level on the clean side.
Figures 2A, 2B:
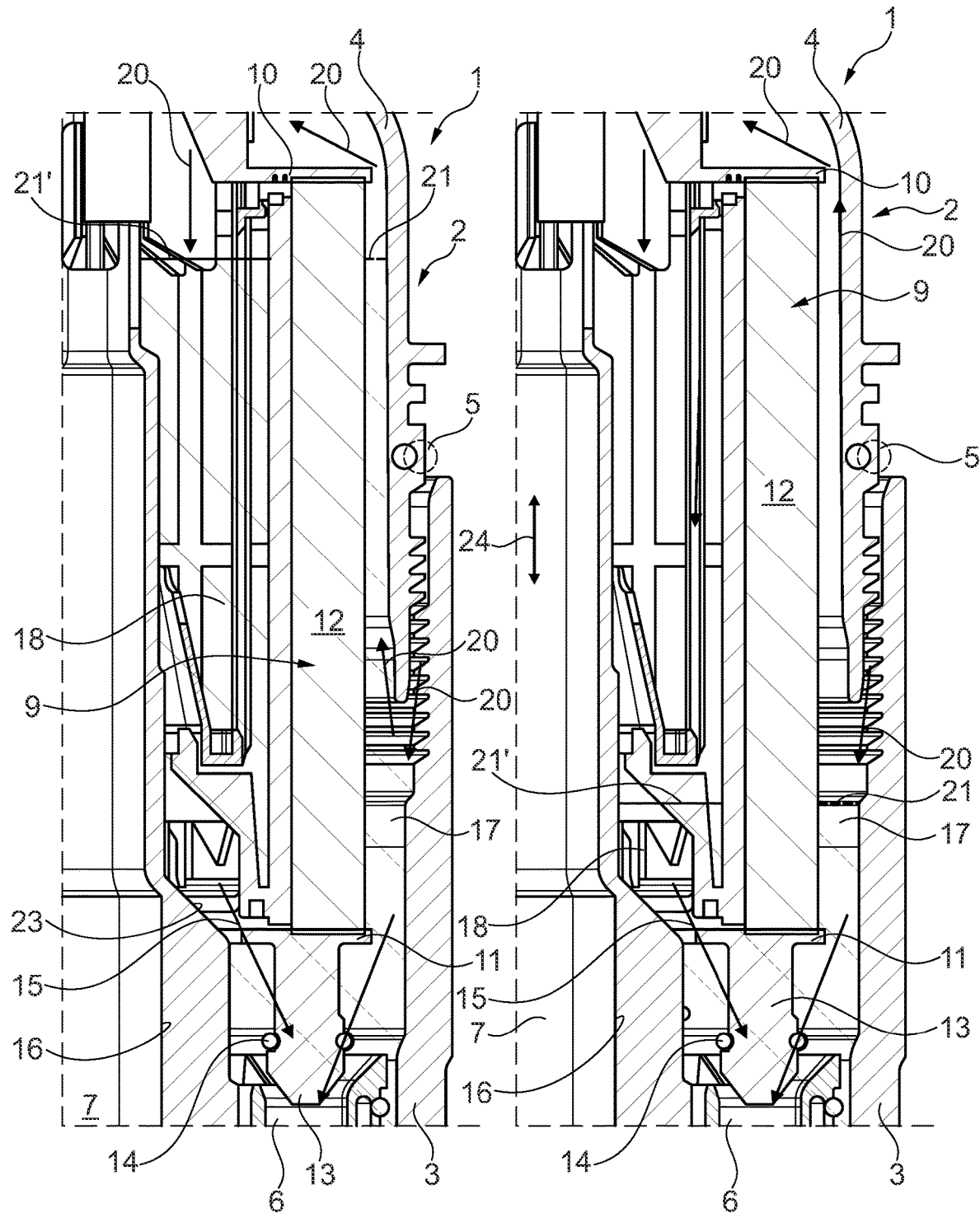
FIG. 2A shows a further sectional view through a liquid filter device according to the invention with raised filter housing cover and with air entering via the housing seal onto the raw side and via the third seal onto the clean side.
FIG. 2B shows a view as in FIG. 2A, however with a fallen liquid level both on the raw side and also on the clean side.
Figure 2C:
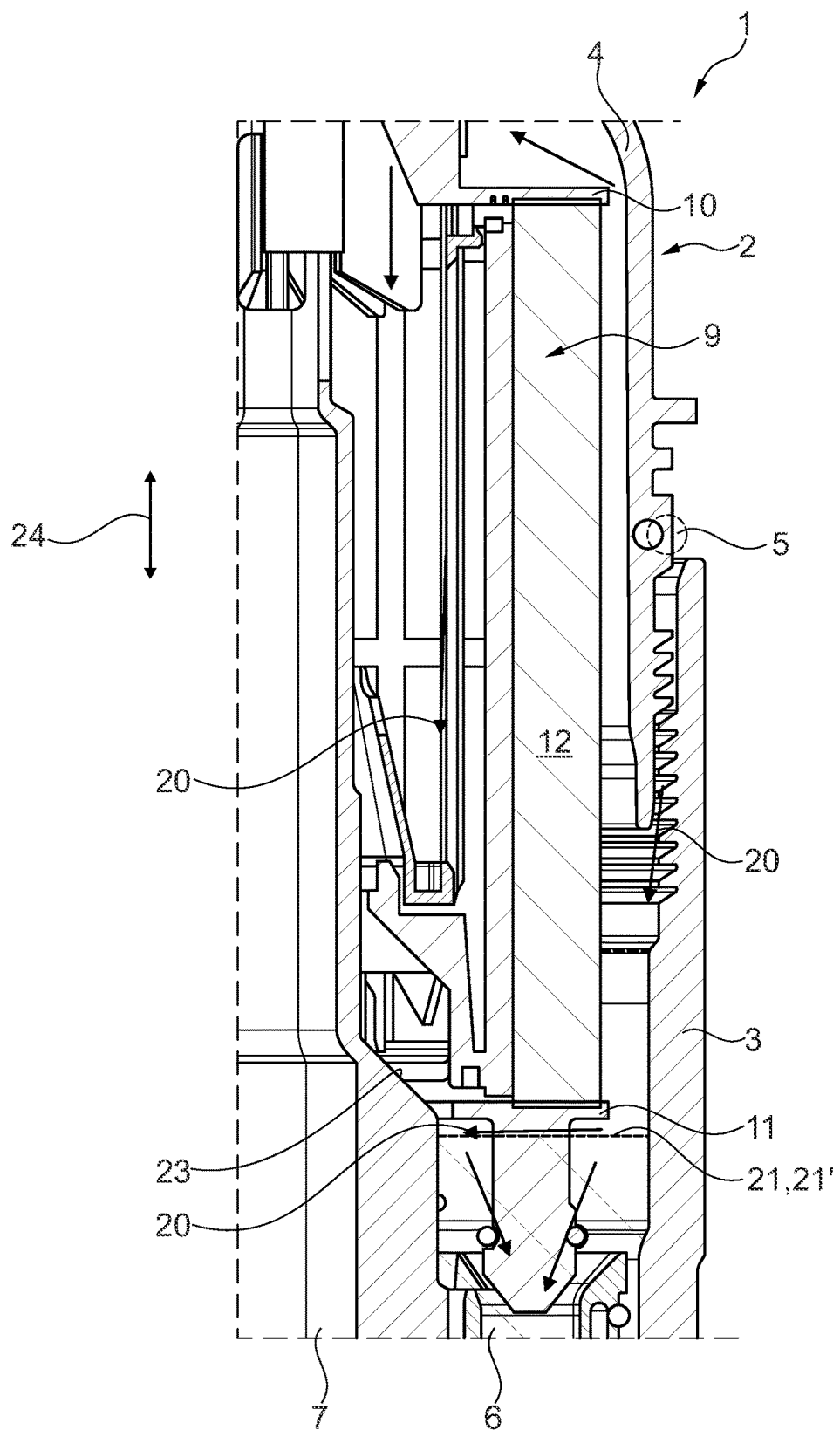
FIG. 2C shows a view as in FIG. 2B, however with a further fallen liquid level, so that air also arrives via the second seal onto the clean side.

According to FIGS. 1 and 2, a liquid filter device 1 according to the invention, which can be formed for example as an oil filter, as a urea filter or as a fuel filter, has a filter housing 2, which consists of a filter housing pot 3 and a filter housing cover 4, able to be connected therewith, in particular able to be screwed therewith. In the region of a screw connection between the filter housing cover 4 and the filter housing pot 3, a housing seal 5, for example an O-ring seal, is provided here. In the filter housing pot 3 in addition a discharge channel 6, a central clean channel 7 and a vent channel 8, arranged, in particular coaxially, in the clean channel 7, are provided. A ring filter element 9 with an upper end plate 10, a lower end plate 11 and a pleated star 12 arranged therebetween, is also arranged in the filter housing 2. The pleated star 12 constitutes the filter material here. On the lower end plate 11 of the ring filter element 9 an axially and eccentrically protruding pin 13 is arranged, which in the operating state of the liquid filter device 1 engages via a first seal 14 tightly into the discharge channel 6 and closes the latter. On the lower end plate 11, moreover, a central second seal 15 is provided which, in the operating state of the liquid filter device, lies tightly against an outer peripheral surface 16 of the clean channel 7 and separates a raw side 17 from a clean side 18. On the upper end plate 10 of the ring filter element 9 a third seal 19 is provided, which is shown exclusively in FIGS. 1A to 1C, but is also present in an identical or analogous manner in the embodiments according to FIGS. 2A to 2C and which, in the operating state of the liquid filter device 1, lies tightly against an outer peripheral surface 16' of the vent channel 8 and likewise separates the raw side 7 from the clean side 18.

According to the invention, the individual seals 5, 14, 15 and 19 are now arranged with respect to one another in such a way that in the case of opening of the filter housing cover 4, firstly the first seal 14 and subsequently the housing seal 5 and the second seal 15 are opened, so that air 20 flows via the housing seal onto the raw side 17 and the latter discharges (cf. FIG. 1A) until a liquid level 21 on the raw side 17 is arranged below the second seal 15 or respectively falls under the second seal 15 (cf. FIG. 1C), and air 20 arrives onto the clean side 18, and subsequently the clean side 18 can discharge, as is illustrated according to FIG. 1C. The liquid level on the clean side 18 is designated here by the reference number 21'.

Alternatively, the individual seals 5, 14, 15 and 19 can also be arranged with respect to one another in such a way that in the case of opening of the filter housing cover 4, i.e. an unscrewing thereof from the filter housing pot 3, firstly the first seal 14 is opened by drawing out of the pin 13 from the discharge channel 6 and subsequently the housing seal 5, the second seal 15 and the third seal 19 are opened, so that according to FIG. 2A air 20 flows via the housing seal 5 onto the raw side 17 and from there via the third seal 19 onto the clean side 18 and thereby the raw side 17 and the clean side 18 discharge simultaneously, as is illustrated according to FIG. 2B. When the liquid level 21 on the raw side 17 and the liquid level 21' on the clean side 18 falls below the second seal 15, then air 20 can also arrive via the second seal 15 onto the clean side 18.

Irrespective of the selected variant, the liquid filter device 1 according to the invention always prevents an undesired passing of non-purified liquid over from the raw side 17 to the clean side 18 in the case of opening of the filter housing 2. At the same time, a draining of the liquid via the discharge channel 6 can be enabled in a problem-free manner, without it having to be feared here that the liquid arrives into the environment.

Observing FIG. 1A, it can be seen that a free end 22 of the vent channel 8 lies above a free end 22' of the clean channel 7, as well as above a liquid level 21, on the raw side 17, whereby a reliable venting of the purified fluid onto the raw side 17 is enabled.

The clean channel 7 can have an upwardly directed cross-section taper 23, wherein the second seal 15 of the ring filter element 9 in the operating state of the liquid filter device 1 lies beneath the cross-section taper 23 against the outer peripheral surface 16 of the clean channel 7. In the case of opening of the filter housing cover 4, i.e. in the case of an unscrewing thereof from the filter housing pot 3, the ring filter element 9 is drawn upwards via corresponding detent contours 25 arranged on its upper end plate 10, which interact with counter-detent contours 26 on the filter housing cover side, whereupon the second seal 15 moves over the cross section taper 23 and loses its sealing effect. In the operating state, the seals 5, 14, 15, 19 are arranged here ascending from bottom upward as follows: First seal 14, second seal 15, housing seal 5 and third seal 19. The individual seals 14, 15 and 19 are, moreover, arranged with respect to one another in such a way that a distance $a_1$ in axial direction 24 between the first and the second seal 14, 15 and a distance $a_2$ in axial direction 24 between the second and the third seal 15, 19 fulfils the following relationship: $2 < a_2/a_1 < 20$, preferably $5 < a_2/a_1 < 15$.

Hereby, it can be guaranteed that in the case of unscrewing of the filter housing cover 4 from the filter housing pot 3, the individual seals 14, 15, 5 and 19 interact with one another in such a way that an emptying of the raw side 17 and of the clean side 18 takes place without a passing of non-filtered fluid or respectively liquid over from the raw side 17 to the clean side 18 taking place.

In particular the opening sequence of the seals 14, 15, 19 with respect to one another is important here. The central O-ring, i.e. the third seal 19, is to open simultaneously or earlier than the first seal 14 (pin O-ring) and the housing seal 5 (cover O-ring).

Not only is the entire liquid filter device 1 to be protected, but also the ring filter element 9 which is used for this, which has an upper end plate 10, a lower end plate 11, and a filter material arranged therebetween, for example a pleated star 12. On the lower end plate 11 here the axially and eccentrically protruding pin 13 is arranged with the first seal 14, as well as a central second seal 15. On the upper end plate 10, the third seal 19 is arranged, which can either be centrally arranged, in so far as the vent channel 8 is also arranged coaxially and centrally in the clean channel 7, or eccentrically to the clean channel 7, wherein in this case the upper end plate 10 must have an eccentric opening for the vent channel 8, which can be used favourably for a key-lock system.

The seals 14, 15 and 19 are arranged here with respect to one another in such a way that a distance $a_1$ in axial direction 24 between the first and the second seal 14, 15 and a distance $a_2$ in axial direction 24 between the second and the third seal 15,19 fulfils the following relationship: $2<a_2/a_1<20$, preferably $5<a_2/a_1<15$. By means of such a ring filter element 9 a reliable emptying of the filter housing 2 can be achieved, without it having to be feared that in an unintended manner liquid arrives from the raw side 17 to the clean side 18 and leads to contaminations there.

A method for emptying the liquid filter device 1 is described in addition briefly below, in which firstly the filter housing cover 4 is detached from the filter housing pot 3, in particular is unscrewed.

In a first alternative, which is illustrated according to FIGS. 1A to 1C, with the unscrewing of the filter housing cover 4 firstly the first seal 14 and subsequently the housing seal 5 and the second seal 15 are opened, so that air 20 flows via the housing seal 5 onto the raw side 17 and the latter discharges (cf. FIG. 1A), until a liquid level 21 on the raw side 17 falls below the second seal 15 (cf. FIG. 1B) and subsequently air 20 arrives onto the clean side 18 and this discharges (cf. FIG. 1C). Subsequently, the filter housing cover 4 can be unscrewed completely, in order to draw the ring filter element 9 out from the filter housing pot 3. For this, however, there should be a wait of two minutes, in order to guarantee a reliable emptying of the filter housing pot 3 via the discharge channel 6. Alternatively, it is also conceivable that after the unscrewing of the filter housing cover 4 from the filter housing pot 3, firstly the first seal 14 and subsequently the housing seal 5, the second seal 15 and the third seal 19 are opened, so that air flows via the housing seal 5 simultaneously onto the raw side 17 (cf. FIG. 2A), and via the third seal 19 onto the clean side 18, and the raw side 17 and the clean side 18 can discharge simultaneously. When the liquid level 21 falls below the second seal 15, then air 20 can also arrive via the second seal 15 onto the clean side 18. All in all, with the liquid filter device 1 according to the invention, with the ring filter element 9 according to the invention and with the method according to the invention a reliable and easy emptying of the liquid filter device 1 can be guaranteed in the case of maintenance, for example in the exchange of the ring filter element 9, without it having to be feared here that in an undesirable manner liquid arrives from the raw side 17 to the clean side 18 and leads to contaminations there.

The invention claimed is:

1. A liquid filter device, comprising:
   a filter housing including a filter housing cover and a filter housing pot connectable tightly therewith via a housing seal;
   a discharge channel, a central clean channel, and a vent channel disposed in the filter housing pot, the vent channel arranged in the clean channel;
   a ring filter element arranged in the filter housing, the ring filter element including an upper end plate, a lower end plate, and a pleated star arranged between the upper end plate and the lower end plate;
   an axially and eccentrically protruding pin arranged on the lower end plate, the pin disposed in the discharge channel and tightly engaging the discharge channel via a first seal when the liquid filter device is in an operating state;
   a central second seal arranged on the lower end plate, the second seal disposed tightly against an outer peripheral surface of the clean channel separating a raw side from a clean side when the liquid filter device is in the operating state;
   a third seal arranged on the upper end plate, the third seal disposed tightly against an outer peripheral surface of the vent channel separating the raw side from the clean side when the liquid filter device is in the operating state;
   wherein the housing seal, the first seal, and the second seal are arranged with respect to one another such that when detaching the filter housing cover from the filter housing pot one of:
   the first seal is opened prior to the housing seal and the second seal such that air flows onto the raw side via the housing seal, the raw side discharges liquid retained on the raw side until a liquid level on the raw side falls below the second seal, the air arrives onto the clean side via the second seal, and the clean side discharges liquid retained on the clean side; and
   the first seal is opened prior to the housing seal, the second seal, and the third seal such that (i) air flows simultaneously onto the raw side via the housing seal and onto the clean side via the third seal, and (ii) the raw side and the clean side discharge simultaneously the clean channel includes an elongated annular clean channel body having (i) an inner circumferential surface defining the clean channel and (ii) an outer circumferential surface defining the outer peripheral surface of the clean channel; and
   the vent channel includes an elongated annular vent channel body having (i) an inner circumferential surface defining the vent channel and (ii) an outer circumferential surface defining the outer peripheral surface of the vent channel.

2. The liquid filter device according to claim 1, wherein the vent channel body projects from a free end of the clean channel body such that a free end of the vent channel body is disposed above the free end of the clean channel body.

3. The liquid filter device according to claim 1, wherein:
   the clean channel has an upwardly directed cross-section taper region in which the outer circumferential surface of the clean channel body tapers radially inward in a direction towards the filter housing cover; and
   the second seal is disposed beneath the cross-section taper and abuts against the outer peripheral surface of the clean channel.

4. The liquid filter device according to claim 1, wherein:
   an axial first distance a1 is defined between the first seal and the second seal;
   an axial second distance a2 is defined between the second seal and the third seal; and
   the housing seal, the first seal, the second seal, and the third seal are arranged with respect to one another such that $2<a2/a1<20$.

5. The liquid filter device according to claim 1, further comprising a plurality of detent contours arranged on the upper end plate and a plurality of counter-detent contours arranged on the filter housing cover, wherein the plurality of detent contours and the plurality of counter-detent contours are structured and arranged to interact with one another such that unscrewing the filter housing cover from the filter housing pot raises the ring filter element.

6. A method for emptying a liquid filter device having a filter housing in which a ring filter element is arranged, the filter housing including a filter housing cover and a filter housing pot tightly connectable to one another via a housing seal, the filter housing pot including a discharge channel, a central clean channel, and a vent channel disposed therein, the vent channel arranged in the clean channel, the ring filter element including an upper end plate, a lower end plate, a pleated star arranged between the upper end plate and the lower end plate, an axially and eccentrically protruding pin arranged on the lower end plate, a first seal arranged on the pin, a central second seal arranged on the lower end plate, and a third seal arranged on the upper end plate, the method comprising:
  providing the filter housing in an operating state where the filter housing cover is connected to the filter housing pot, the pin is disposed in the discharge channel and tightly engages the discharge channel via the first seal, the second seal is disposed tightly against an outer peripheral surface of the clean channel separating a raw side from a clean side, and the third seal is disposed tightly against an outer peripheral surface of the vent channel and separates the raw side from the clean side;
  detaching the filter housing cover from the filter housing pot;
  wherein detaching the filter housing cover from the filter housing pot includes one of:
    opening the first seal, opening the housing seal and the second seal after opening the first seal, flowing air onto the raw side via the housing seal, discharging liquid retained on the raw side until a liquid level on the raw side falls below the second seal, flowing air onto the clean side via the second seal, and discharging liquid retained on the clean side; and
    opening the first seal, opening the housing seal, the second seal, and the third seal after opening the first seal, flowing air simultaneously onto the raw side via the housing seal and onto the clean side via the third seal, and simultaneously discharging the liquid retained on the raw side and the liquid retained on the clean side the clean channel includes an elongated annular clean channel body having (i) an inner circumferential surface defining the clean channel and (ii) an outer circumferential surface defining the outer peripheral surface of the clean channel; and
  the vent channel includes an elongated annular vent channel body having (i) an inner circumferential surface defining the vent channel and (ii) an outer circumferential surface defining the outer peripheral surface of the vent channel.

7. The method of claim 6, wherein detaching the filter housing cover from the filter housing pot includes unscrewing the filter housing cover from the filter housing pot.

8. The method of claim 7, further comprising adjusting a position of the ring filter element via unscrewing the filter housing cover from the filter housing pot.

9. The method of claim 7, wherein unscrewing the filter housing cover from the filter housing pot includes adjusting a position of the ring filter element via interacting a plurality of counter-detent contours of the filter housing cover with a plurality of detent contours of the upper end plate of the ring filter element.

10. The liquid filter device according to claim 1, wherein:
  the housing seal, the first seal, and the second seal are arranged with respect to one another such that when detaching the filter housing cover from the filter housing pot the air arrives onto the clean side via the second seal; and
  the clean channel has a radial cross-section that tapers in an axial direction of the clean channel.

11. The liquid filter device according to claim 1, wherein:
  the housing seal, the first seal, and the second seal are arranged with respect to one another such that when detaching the filter housing cover from the filter housing pot the air flows simultaneously onto the raw side via the housing seal and onto the clean side via the third seal; and
  the clean channel has a radial cross-section that tapers in an axial direction of the clean channel.

12. The liquid filter device according to claim 1, wherein the vent channel is arranged coaxially within the clean channel.

13. The liquid filter device according to claim 4, wherein the housing seal, the first seal, the second seal, and the third seal are arranged with respect to one another such that $5<a2/a1<15$.

14. The method of claim 6, wherein detaching the filter housing cover from the filter housing pot further includes:
  waiting a predetermined period of time after opening at least one of the housing seal, the first seal, the second seal, and the third seal; and
  completely removing the filter housing cover from the filter housing pot after waiting the predetermined period of time.

15. The method of claim 6, wherein:
  the clean channel includes an elongated annular clean channel body having (i) an inner circumferential surface defining the clean channel and (ii) an outer circumferential surface defining the outer peripheral surface of the clean channel; and
  the vent channel includes an elongated annular vent channel body having (i) an inner circumferential surface defining the vent channel and (ii) an outer circumferential surface defining the outer peripheral surface of the vent channel.

16. The method of claim 15, wherein:
  the clean channel body has a tapered region in which the outer circumferential surface of the clean channel body tapers radially inward in a direction towards the filter housing cover; and
  opening the second seal of the housing includes producing a gap between the second seal and the outer circumferential surface of the clean channel body via adjusting the second seal at least one of to the tapered region and beyond the tapered region.

* * * * *